May 23, 1961  J. PERROCHAT  2,984,877
CLIP
Filed Feb. 25, 1958

INVENTOR:
JEAN PERROCHAT,
BY Philip E. Parker
ATTORNEY.

United States Patent Office 2,984,877
Patented May 23, 1961

2,984,877
CLIP

Jean Perrochat, Loerrach, Germany, assignor to
A. Raymond, Grenoble, France, a firm Filed Feb. 25, 1958, Ser. No. 717,430

Claims priority, application Germany Feb. 26, 1957

1 Claim. (Cl. 24—73)

The invention relates to a fastening clamp and particularly a clamp for fastening hollow ornamental ledges on motor vehicles. At the moment, ornamental ledges on the body of motor vehicles are fastened with the aid of screws, steel clamps and clips. The fastening with screws is laborious, expensive and not always applicable. The fastening by means of steel clamps and clips has the drawback that the bore in the car body into which the steel clamps are inserted is not sealed, through which water and moisture can get through the bore into the inside of the car body.

The invention eliminates this disadvantage in that according to the invention, the fastening clamp consists of elastic, flexible synthetic, which fills out the hole in the car body wall completely and provides a sealing effect.

Furthermore, the fastening clamp exhibits according to the invention a flexible plug which can be inserted into a hole of the panel and is provided with a constriction which carries a likewise flexible plate with two arms, which reach into the hollow space of the ornamental ledge. The arms of the fastening clamp which reach into the hollow space of the ornamental ledge are curved in elbow-shape so that they grip behind the edges of the hollow space of the ornamental ledge. Moreover, the plate sitting on the plug is chamfered so that when the plug is pressed into the hole of the panel, it lies firmly against the edge of the hole in the panel and seals it. The inserting plug itself is made hollow according to the invention and proceeds conically on the outside below the constriction.

On the drawing is represented an example of execution of the invention.

These are shown:

Figure 1:
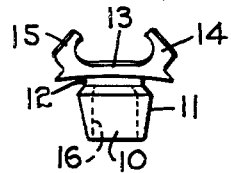
Fig. 1 is a view of the fastener in front elevation.
Figure 2:
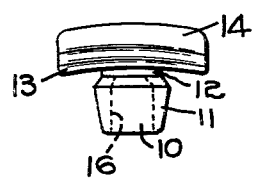
Fig. 2 is a view of the fastener as shown in Fig. 1 as seen from the right side.
Figure 3:
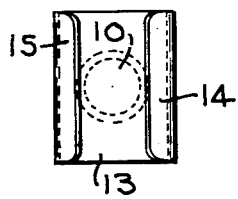
Fig. 3 is a plan view of the fastening clamp.
Figure 4:
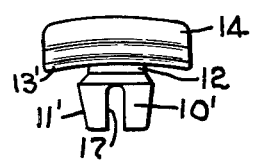
Fig. 4 is a view similar to Fig. 2 of a modified form of the fastener.

Referring to the drawing, the fastening clamp according to Figs. 1 and 2 consists of an elastic, flexible synthetic and comprises a plug 10, whose body 11 is shaped conically, having a constriction 12. On the top surface lies a rectangular plate 13 with two arms 14 and 15 curved outward like elbows. The plug 10 is provided on the inside with a hollow portion 16. The plate 13 is chamfered in the direction of the plug, somewhat lengthwise as well as in the transverse direction. Fig. 4 shows essentially the same execution, however, the plug 10' is not provided with the hollow space 16, but possesses instead a slit 17, through which it becomes just as flexible as through the hollow space 16.

Figure 5:
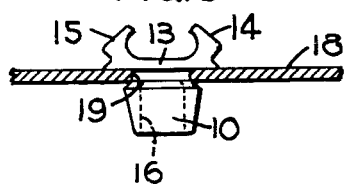
Fig. 5 is a view of the fastener as shown in Fig. 1 showing the fastener inserted into a panel aperture.
Figure 6:
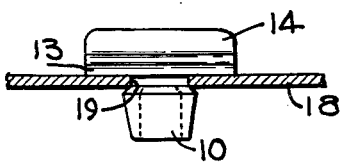
Fig. 6 is a view similar to Fig. 2 showing the fastener in assembly in a panel.
Figure 7:
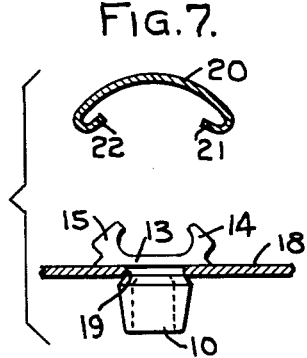
Fig. 7 is a view in front elevation of the fastener inserted in a panel with a molding juxtaposed prior to assembly.
Figure 8:
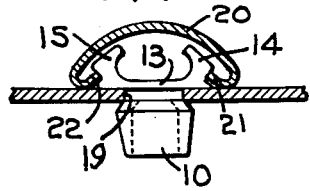
Fig. 8 is a view in section showing the molding snapped over the fastener.

In Fig. 5, the fastening clamp is represented inserted into a panel 18. The fastening clamp is inserted with the plug 10 through a hole 19 of the panel so that as a result of the arrangement of the hollow portion 16 in the plug 10, the latter forces itself through the hole 19 until the constriction 12 gets into the hole 19 and the conical part grips behind the margin of the hole. The edges of the curved form of the plate 13 come to lie firmly against the panel so that it is sealed against water passage. After the fastening clamp has been inserted in this manner into the hole 19 of the panel, the ornamental ledge 20 is so applied according to Fig. 7 so that the edges of its hollow space 21 and 22 lie above the elbow-like curved arms 14 and 15 on the plate 13. The ornamental ledge is then pressed on over the arms 14 and 15 so that the elbows of the arms grip behind the edges 21 and 22 of the ornamental ledge 20 (Fig. 8). The applied ornamental ledge sits firmly on the panel as a result of this and prevents water penetrating through the holes in the car body wall into the interior of the car body since the fastening clamp seals off these holes effectively. The clamp is always under tension when it is pressed into the panel. The sharply proceeding edges of the plate 13 lie firmly against the panel so that the water runs off externally. The curvature of the plate enables it to spring back into the curved form again and as a result of this action, the conical part of the plug is always pulled against the inner opening of the panel and seals it off from the inside.

Upon application of the ornamental ledge to the fastening clamp, the ornamental ledge, if it is elastic, can either yield, or the arms 14, 15 on the plate 13 can be pressed together, if the plastic material of which the clamp is made possesses the necessary elasticity.

Since certain other obvious modifications may be made in this device without departing from the scope of the invention, it is intended that all matters contained herein be interpreted in an illustrative and not in a limiting sense.

I claim:

A one piece molded plastic self sealing snap fastener for assembly to an apertured panel, said fastener comprising a yieldable plug portion for snapping insertion within and unsnapping removal from an apertured panel and a laterally yieldable molding engaging head at one end of the said plug portion, said plug portion having an annular tapered shoulder facing the molding engaging head and a constricted portion between the shoulder and the head, said plug portion being solid in cross section for at least the length of the constricted portion so that it is free of axial compression and to cooperate with said shoulder and said head to seal an aperture in a panel against the passage of moisture and said shoulder being compressible laterally upon initial engagement with and removal from a wall around an aperture in a panel and said head having elbow like portions shaped for snap engagement with and unsnapping engagement from a hollow molding.

References Cited in the file of this patent

UNITED STATES PATENTS

| 1,743,493 | Sipe | Jan. 14, 1930 |
| 1,915,249 | Jorgensen | June 20, 1933 |
| 2,148,401 | Ellis | Feb. 21, 1939 |
| 2,258,788 | Meyer et al. | Oct. 14, 1941 |
| 2,759,390 | Edwards | Aug. 21, 1956 |
| 2,851,078 | Mellon et al. | Sept. 9, 1958 |

FOREIGN PATENTS

| 745,788 | Great Britain | Feb. 29, 1956 |
| 1,051,695 | France | Sept. 16, 1953 |
| 1,111,742 | France | Nov. 2, 1955 |